United States Patent
Ogita et al.

[11] Patent Number: 5,982,816
[45] Date of Patent: Nov. 9, 1999

[54] DIGITAL COMMUNICATION SYSTEM USING PACKET ASSEMBLING/DISASSEMBLING AND EIGHT-TO-FOURTEEN BIT ENCODING/DECODING

[75] Inventors: Minoru Ogita; Hirokazu Kato, both of Hamamatsu, Japan

[73] Assignee: Yamaha Corporation, Hamamatsu, Japan

[21] Appl. No.: 08/429,859

[22] Filed: Apr. 27, 1995

[30] Foreign Application Priority Data

May 2, 1994 [JP] Japan ................................. 6-115919

[51] Int. Cl.⁶ .................................................. H04B 1/66
[52] U.S. Cl. .......................... 375/240; 375/259; 370/476; 341/60
[58] Field of Search ................... 375/240, 259; 370/476, 474, 473; 341/60, 61

[56] References Cited

U.S. PATENT DOCUMENTS

| | | | |
|---|---|---|---|
| 4,205,200 | 5/1980 | Parikh et al. | 370/83 |
| 4,694,336 | 9/1987 | Kessen et al. | 370/83 |
| 4,709,227 | 11/1987 | Guerillot | 370/83 |
| 5,231,492 | 7/1993 | Dangi et al. | 370/83 |
| 5,382,776 | 1/1995 | Arii et al. | 235/375 |
| 5,461,619 | 10/1995 | Citta et al. | 370/83 |
| 5,528,570 | 6/1996 | Kondo | 369/48 |
| 5,651,087 | 7/1997 | Nagano et al. | 386/61 |

Primary Examiner—Chi H. Pham
Assistant Examiner—Bryan Webster
Attorney, Agent, or Firm—Pillsbury Madison & Sutro

[57] ABSTRACT

A digital communication system communicates data between a transmitter station and a receiver station by means of a carrier wave. The transmitter station has a packet assembler for assembling data having an original format into a packet, an encoder for encoding the data in the packet from an initial eight-bit form into a fourteen-bit form, and a modulator for modulating a carrier wave by the encoded data so as to transmit the packet of encoded data in the fourteen-bit form. The receiver station has a demodulator receptive of the modulated carrier wave for demodulating the same to separate therefrom the packet of encoded data, a decoder for decoding the encoded data in the packet from the fourteen-bit form into the initial eight-bit form, and a packet disassembler for disassembling the packet of decoded data to restore the original format of the data having the initial eight-bit form.

11 Claims, 5 Drawing Sheets

FIG.4

|  | Data bits | Channel bits |
|---|---|---|
| 0 | 00000000 | 01001000100000 |
| 1 | 00000001 | 10000100000000 |
| 2 | 00000010 | 10010000100000 |
| 3 | 00000011 | 10001000100000 |
| 4 | 00000100 | 01000100000000 |
| 5 | 00000101 | 00000100010000 |
| 6 | 00000110 | 00010000100000 |
| 7 | 00000111 | 00100100000000 |
| 8 | 00001000 | 01001001000000 |
| 9 | 00001001 | 10000001000000 |
| 10 | 00001010 | 10010001000000 |
| 11 | 00001011 | 10001001000000 |
| 12 | 00001100 | 01000001000000 |
| 13 | 00001101 | 00000001000000 |
| 14 | 00001110 | 00010001000000 |
| 15 | 00001111 | 00100001000000 |
| 16 | 00010000 | 10000000100000 |
| 17 | 00010001 | 10000010000000 |
| 18 | 00010010 | 10010010000000 |
| 19 | 00010011 | 00100000100000 |
| 20 | 00010100 | 01000010000000 |
| 21 | 00010101 | 00000010000000 |
| 22 | 00010110 | 00010010000000 |
| 23 | 00010111 | 00100010000000 |
| 24 | 00011000 | 01001000010000 |
| 25 | 00011001 | 10000000010000 |
| 26 | 00011010 | 10010000010000 |
| 27 | 00011011 | 10001000010000 |
| 28 | 00011100 | 01000000010000 |
| 29 | 00011101 | 00001000010000 |
| 30 | 00011110 | 00010000010000 |
| 31 | 00011111 | 00100000010000 |
| 32 | 00100000 | 00000000100000 |
| ⋮ | ⋮ | ⋮ |

DIGITAL COMMUNICATION SYSTEM USING PACKET ASSEMBLING/DISASSEMBLING AND EIGHT-TO-FOURTEEN BIT ENCODING/DECODING

BACKGROUND OF THE INVENTION

The present invention relates to a digital communication system, which can perform a highly reliable digital communication at low cost by digital modulation after a packet process and an 8 bit-14 bit encoding (EFM) process for desired data at a transmission station.

Conventionally, a karaoke performing apparatus has means for transferring a song data read out from an optical disc such as a CD (compact disc), as shown in FIG. 2 (for example, see Unexamined Japanese Patent Publication No. 5-119788). Specifically, double phase shift keying (2 PSK) modulation is performed at an RF modulator 2 according to EFIM data, such as, karaoke performance data, which is reproduced from a CD player 1, and the modulated output is transmitted to an RF demodulator 4 via a transmission cable 3. At the demodulator 4, the transmitted output is demodulated to pick up therefrom the EFM data, which is then supplied to an EFM decoder 5. At the decoder 5, the EFM data is decoded, and the decoded data is supplied to a D/A converter 6. An analog signal from the converter 6 is supplied to a sound system 8 along with a singing voice signal from a microphone 7 so as to generate mixed sounds.

According to the foregoing data transfer system, since the digital transmission system and an error correction process is performed at the EFM decoder 5 and the like, the highly reliable data transmission is possible as compared with an analog transmission system. However, there is inconvenience that recorded data can be transmitted in only one way. On the other hand, as a further highly reliable digital communication system than that shown in FIG. 2, a system of quadruplex PSK (4 PSK) modulation type is used in a satellite broadcast (BS), which, however, is inconvenient in that encoding for modulations is complicated, leading to high cost.

SUMMARY OF THE INVENTION

An object of the present invention is to provide a highly reliable digital communication system at low cost. According to the invention, a digital communication system comprises a transmitter station and a receiver station for communicating therebetween data by means of a carrier wave. The transmitter station comprises packet means for assembling data having an original format into a packet, encoding means for encoding the data in the packet from an initial eight-bit form into a fourteen-bit form, and modulating means for modulating a carrier wave by the encoded data so as to transmit the packet of encoded data in the fourteen-bit form. The receiver station comprises demodulating means receptive of the modulated carrier wave for demodulating the same to separate therefrom the packet of encoded data, decoding means for decoding the encoded data in the packet from the fourteen-bit form into the initial eight-bit form, and unpacket means for disassembling the packet of decoded data to restore the original format of the data having the initial eight-bit form.

In a preferred embodiment, the packet means includes means for adding a self-checking code in the packet, and the unpacket means includes means for detecting an error contained in the data according to the self-checking code so as to correct the error. Further, the encoding means includes means for inserting a self-checking code into the fourteen-bit form of the data, and the decoding means includes means for detecting an error contained in the data according to the self-checking code so as to correct the error. In one embodiment, the transmitting station includes database means for storing song data in an original MIDI format for transmission of the song data in response to a request of a karaoke song from the receiving station, and the receiving station includes performance means for performing the karaoke song according to the song data transmitted from the transmitting station.

According to another aspect of the invention, a digital data transmitter/receiver apparatus for transmitting outgoing data and receiving incoming data by means of a carrier wave in a two-way, comprises packet/unpacket means for assembling the outgoing data having an original format into a forward packet and for disassembling a backward packet of the incoming data to restore the original format, encoding/decoding means for encoding the outgoing data in the forward packet from an initial eight-bit form into a fourteen-bit form and for decoding the incoming data in the backward packet from the fourteen-bit form into the initial eight-bit form, and modulating/demodulating means for modulating a carrier wave by the encoded outgoing data so as to transmit the forward packet of the outgoing data in the fourteen-bit form arid for demodulating another carrier wave to separate therefrom the backward packet of the incoming data received in the fourteen-bit form.

According to the present invention, at the transmitting station, the desired data is subjected to the packet process and the EFM process in sequence, and the self-checking code in the form of error check bits is added by both the packet and EFM processes. Further, at the receiving station, a data error is detected and corrected based on the error check bits in both the decoding process and the unpacket process. Accordingly, the highly reliable data transmnission is achieved. The packet means and the unpacket means are generally used in CD-ROM technique and can be obtained at low cost. Further, the encoding means and the decoding means are generally used in CD technique and can be obtained at low cost.

BRIEF DESCRIPTION OF THE DRAWINGS

FIG. 4 shows a conversion table of eight-to-fourteen bit coding according to the invention.

DETAILED DESCRIPTION OF THE INVENTION

Figure 1:
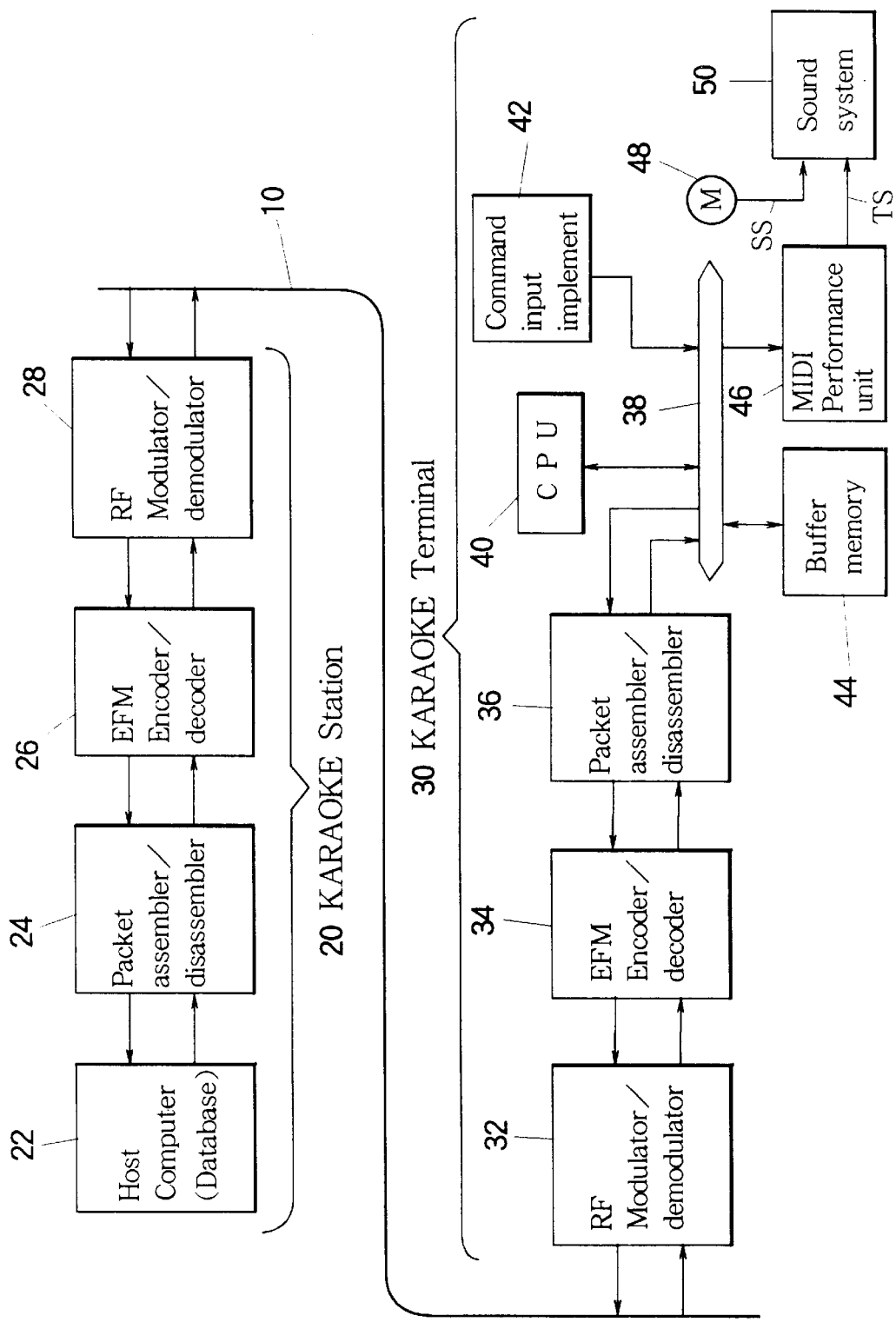
FIG. 1 is a block diagram showing a digital communication system according to one embodiment of the present invention.
Figure 2:
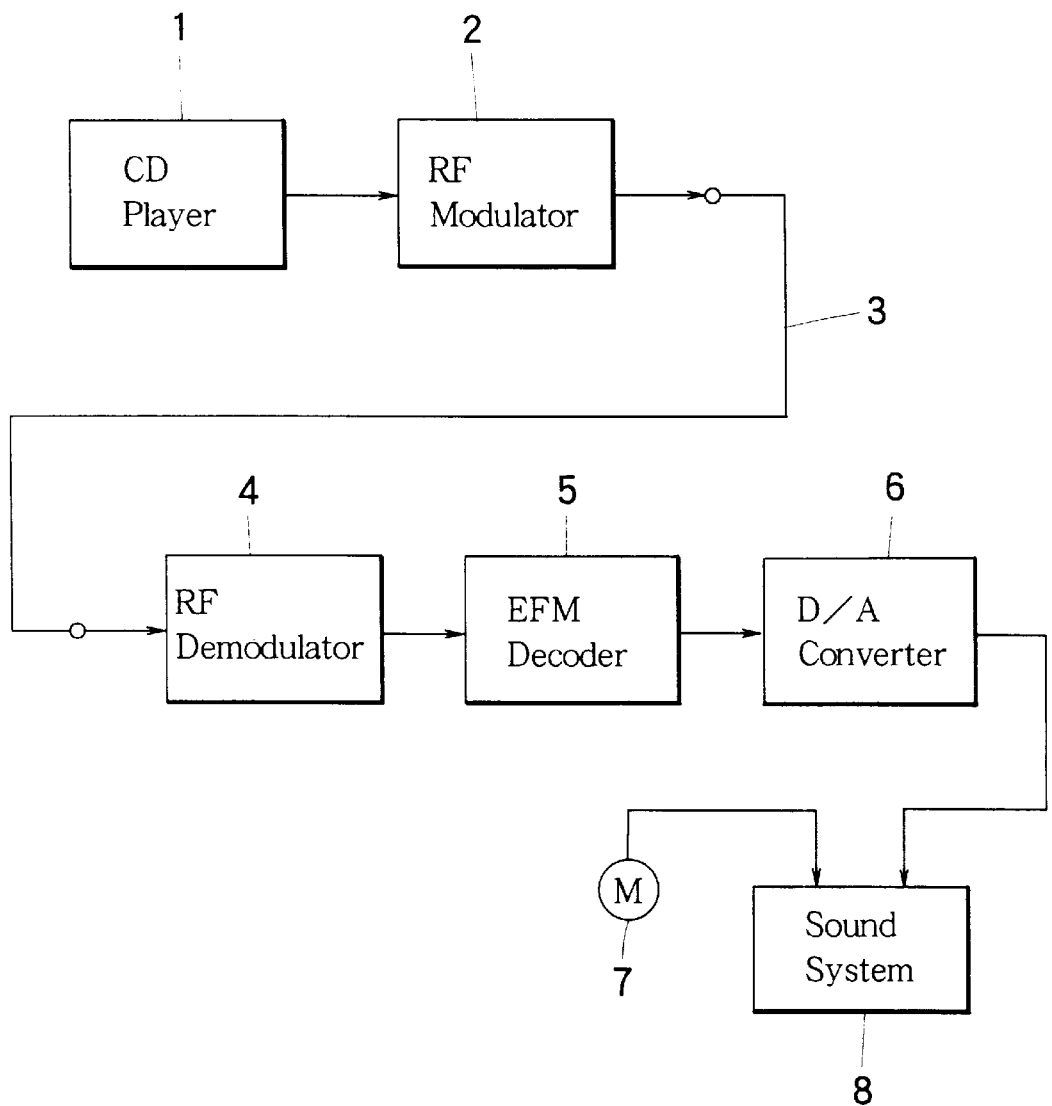
FIG. 2 is a block diagram showing a conventional digital communication system.

FIG. 1 shows a digital communication system according to one embodiment of the present invention. In this embodiment, song data associated to karaoke performance is communicable in a two-way fashion between a transmitting station and a receiving station. A communication line 10 is formed by, for example, a CATV (cable television) line, which interconnects the transmitting station in the form of a karaoke station 20 and the receiving station in the form of a karaoke terminal 30. Although a plurality of karaoke terminals can be connected to the communication line 10, one terminal 30 will be described for convenience.

In the karaoke station 20, when a request for a musical composition of a desired karaoke song is issued from one of the karaoke terminals, a host computer 22 delivers karaoke performance data of that musical composition to the requesting karaoke terminal. In this example, the karaoke performance data is composed of a song data which is arranged in an original format according to the MIDI (musical instrument digital interface) standard, and which is formatted such that a note-on event data (data for designating a tone pitch and a tone volume of a sound to be produced), a note-off event data (data for designating a sound to be attenuated) and other event data are arranged in order of occurrences of events while an interval time data is interposed between preceding and succeeding events.

A packet assembler/disassembler 24 includes an assembler which performs a packet process of the data fed from the computer 22 and a disassembler which performs an unpacket process of the data fed from an EFM encoder/decoder 26. The packet process and the unpacket process are described in a yellow book of CD-ROM, and the bit rate is 1.5–6 Mbps. In the packet process, error check bits are added to the data. In the unpacket process, all error of the data is detected and corrected based on the error check bits.

The EFM encoder/decoder 26 includes an encoder which performs an EFM process for the packet of the data fed from the packet assembler/disassembler 24 and a decoder which performs a decoding process of the EFM data fed from an RF modulator/demodulator 28. The EFM encoding process and the decoding process are described in a red book of CD. In the EFM encoding process, error check bits are added to the data. In the decoding process, all error of the data is detected and corrected based on the error check bits.

The RF modulator/demodulator 28 includes a modulator which modulates an outgoing carrier wave by the EFM data fed from the EFM encoder/decoder 26 and sends the modulated carrier wave to the communication line 10, and a demodulator which demodulates an incoming carrier wave received from the communication line 10. The modulator/demodulator 28, for example, is of 2PSK modulation type.

In the karaoke terminal 30, an RF modulator/demodulator 32, an EFM encoder/decoder 34 and a packet assembler/disassembler 36 have the same structures as the foregoing RF modulator/demodulator 28, EFM encoder/decoder 26 and packet assembler/disassembler 24, respectively, and operate in the same manner.

The RF modulator/demodulator 32 demodulates the modulated carrier wave received from the communication line 10 to pick up or separate therefrom the EFM data, and supplies it to the EFM encoder/decoder 34. The encoder/decoder 34 performs a decoding process of the supplied EFM data and supplies the decoded data to the packet assembler/disassembler 36. The assembler/disassembler 36 performs an unpacket process for the supplied backward packet of the decoded data and supplies the decoded data in a disassembled form to a bus 38. In the decoding process and the unpacket process, data errors are detected arid corrected in the same manner as described above.

The packet assembler/disassembler 36 performs a packet process of an outgoing data fed from a bus 38, and supplies an assembled forward packet of the data to the EFM encoder/decoder 34. The encoder/decoder 34 performs an EFM encoding process of the supplied data, and supplies the EFM data to the RF modulator/demodulator 32. In the packet process and the EFM process, error check bits are added to the data in the same manner as described above. The modulator/demodulator 32 modulates a carrier wave according to the supplied EFM data, and sends the modulated carrier wave to the communication line 10. The RF modulator/demodulator 32, for example, is of 2PSK modulation type. A communication channel determined by a frequency of the carrier wave used at the modulator of the karaoke terminal 30 differs from that used at the modulator of the karaoke station 20.

The bus 38 connects together a CPU (central processing unit) 40, a command input implement 42, a buffer memory 44, an MIDI performance unit 46 and the like. The CPU 40 executes various processes for communication control, musical tone generation and the like according to programs stored in a memory not shown in the drawings. The command input implement 42 is operated for inputting a request command of a desired musical composition of a karaoke song. The inputted request command is transmitted to the host computer 22 via the packet assembler/disassembler 36 the EFM encoder/decoder 34, the RF modulator/demodulator 32, the communication line 10, the RF modulator/demodulator 28, the EFM encoder/decoder 26 and the packet assembler/disassembler 24. The host computer 22 sends karaoke performance data of the requested musical composition in response to the request command. The karaoke performance data is transmitted to the karaoke terminal 30 and is loaded into the buffer memory 44 via the packet assembler/disassembler 24, the EFM encoder/decoder 26, the RF modulator/demodulator 28, the communication line 10, the RF modulator/demodulator 32, the EFM encoder/decoder 34 and the packet assembler/disassembler 36.

The CPU 40 reads out thee event data, such as the note-on event data arid tile note-off event data in sequence based on the event interval time data contained in tile karaoke performance data stored in tie memory 44, and supplies the read event data to the MIDI performance unit 46. The performance unit 46 includes a tone generator and produces a tone signal via a tone generating channel according to the note-on event data, and attenuates the tone signal being produced in response to the note-off event data. Tile tone signal ITS is fed from the performance unit 46 to a sound system 50 along with a singing voice signal SS detected by a microphone (M) 48. The sound system 50 includes an amplifier, a loud-speaker and the like, and converts the signals TS, SS into the karaoke sounds. A singer, after requesting a desired musical composition via the command input implement 42, can enjoy singing along with the accompaniment of the karaoke performance based on the karaoke performance data stored in the memory 44.

The foregoing embodiment is arranged to transfer the MIDI performance data to the karaoke terminal 30 from a database of the karaoke station 20. However, it is not limited to this, it may also be arranged to transfer PCM-recorded tone data. In this case, a D/A converter may be provided instead of the performance unit 46 to convert the PCM tone data into an analog tone signal which is supplied to the sound system 50. Further, it may also be arranged to transfer word data and background image data to the karaoke terminal 30 from the host computer 22 and to control an image display device (not shown in the drawings) of the karaoke terminal 30 to display the word images and the background images. The present invention is applicable to the transfer of various kinds of data, not limited to karaoke song data, and not only applicable to the cable communication but also to a wireless communication.

Figure 3A:
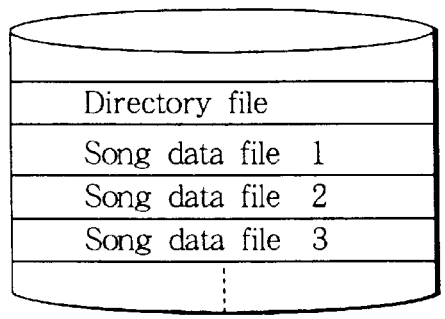
FIGS. 3A, 3B and 3C are schematic diagrams showing packet process of a song data to be transmitted.

FIG. 3A shows an original format of the song data stored in the database of the central karaoke station. The database contains a song data memory area for memorizing numerous files (several hundreds to several thousands) of song data, and a directory file which memorizes identification codes (file names) of the song data files stored in the data memory area.

Figure 3B:
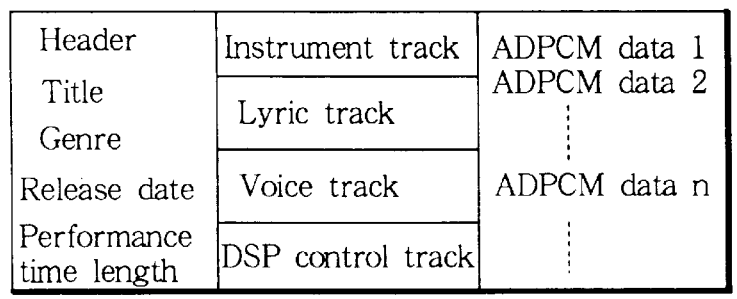

FIG. 3B schematically shows at format of one song data file which includes a header, an instrument track, a lyric track, a voice track, a digital sound field processing (DSP) control track and a voice data section. The header is written with various index data regarding the song such as a title, a genre, a release date, and a time length of performance. The instrument track is divided into subtracks corresponding to various parts of the instrumental accompaniment such as a piano part, a rhythm part and the like. Each subtract is written with a sequence of event data and event interval time data. The lyric track is written with a lyric word data for use in displaying of lyric characters on the monitor. The lyric track does not contain pure MIDI data. However, in order to integrate an overall implementation and to facilitate data processing, the lyric data is prescribed in a specific form of "system-exclusive-message" similar to the MIDI data which is written in the instrument track. The voice track is utilized to generate a voice of a back chorus or the like, which would be hardly synthesized by a tone generator involved in the MIDI performance unit 46. The voice track is processed in combination with the voice data section so as to produce a back chorus sound or a harmony melody sound. The voice data section contains a plurality of ADPCM data sampled from a live chorus sound according to adaptive delta pulse code modulation. The voice track is written with a sequence of duration data and designation data. The duration data determines a timing when an ADPCM data is converted into an analog voice signal. The designation data is read out at that timing. The designation data designates one of the ADPCM data according to an assigned number 1, 2, . . . , n. Further, the DSP control track is written with a control data effective to control a digital sound field processor contained in the karaoke terminal 30. The digital sound field processor is operated to impart a reverberation and other effects to the karaoke sound. The type and variation of the effect is progressively regulated according to the control data written in the DSP control track during the course of the karaoke performance.

Figure 3C:
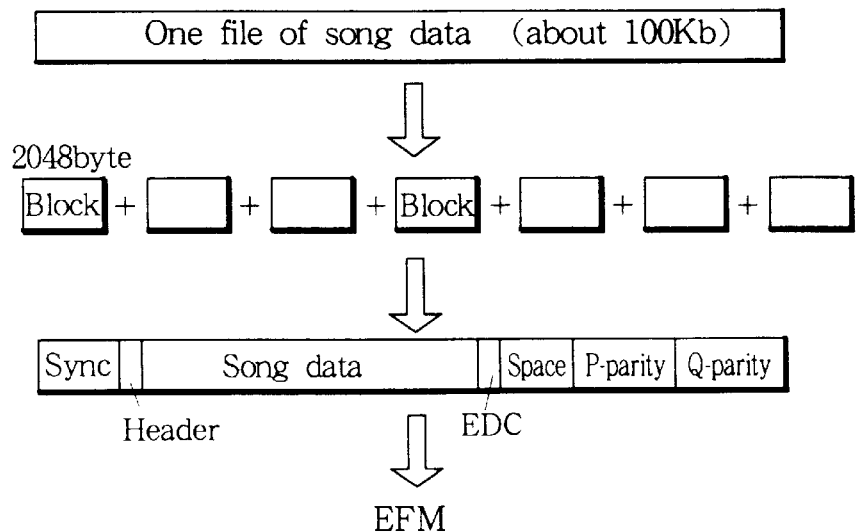

FIG. 3C shows a forward packet of the song data to be transferred from the station to the terminal. One file of the song data is composed of about 100 Kbytes. For example, the song data is divided into blocks each containing 2048 bytes so as to form a packet similar to the CD-ROM format. Each block is added with a sync of 12 bytes and a header of 4 bytes at a top part, while the self-checking code or an error detection code (EDC) of 4 bytes, an identification space of 8 bytes, a P-parity of 172 bits and a Q-parity of 104 bits are added at an end part of the block, thereby forming one packet. A train of the packets are modulated by the EFM method for transmission. On the other hand, the packet is disassembled by the unpacket process so as to remove therefrom the header, the parity bit and the like to restore the original format of the song data.

FIG. 4 shows a conversion table of the EFM. As mentioned before, the EFM encoder/decoder receives the packet and encodes the same according to Eight to Fourteen Modulation (EFM) method. In the EFM method, an eight-bit data is converted into a set of fourteen channel bits such that the maximum inversion interval is set narrowly and the minimum inversion interval is set widely while a DC component is reduced. Such a packet format and its encoding by EFM are commonly adopted in the CD system. Further, the EFM encoder/decoder decodes the EFM data into the data packet of a base band. In detail as indicated by the FIG. 4 table, the EFM method treats an input signal as an eight-bit data which represents 256 ($2^8$) number of symbols. All symbols of the eight-bit form are converted into a fourteen-bit form according to predetermined bit patterns. The fourteen-bit form contains 16384 ($2^{14}$) bit patterns, from which 256 number of suitable bit patterns are selected to correspond to the 256 number of the initial eight-bit data. Namely, the selected bit patterns meet a specific condition that adjacent bits "1" have therebetween bits "0" at least two and at most tell, thereby optimizing the maximum and minimum inversion intervals while reducing a DC component.

Figure 5:
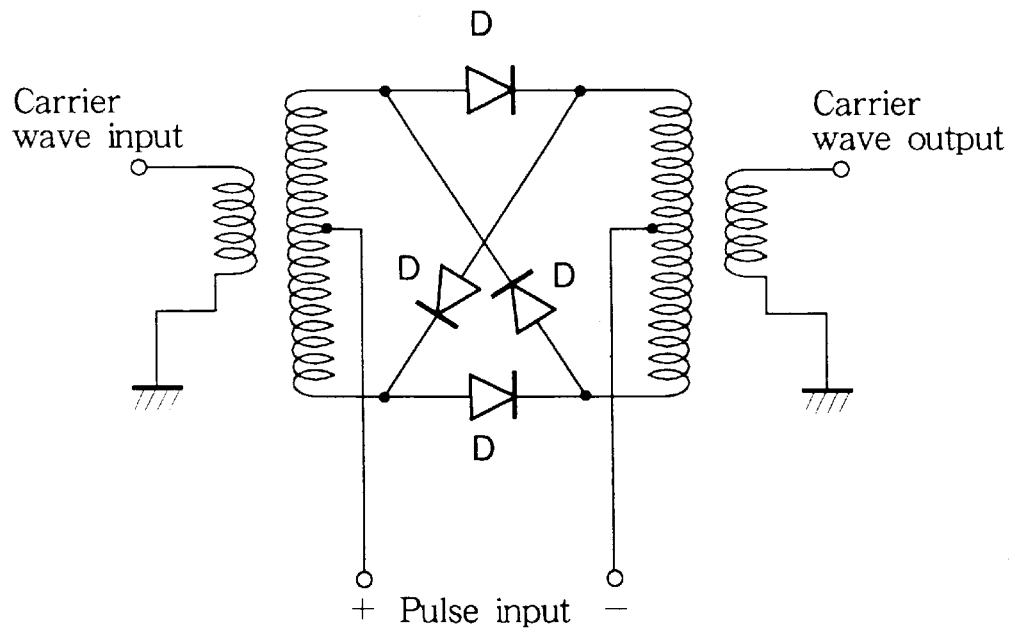
FIG. 5 is a circuit diagram showing one example of a PSK modulator.
Figure 6:
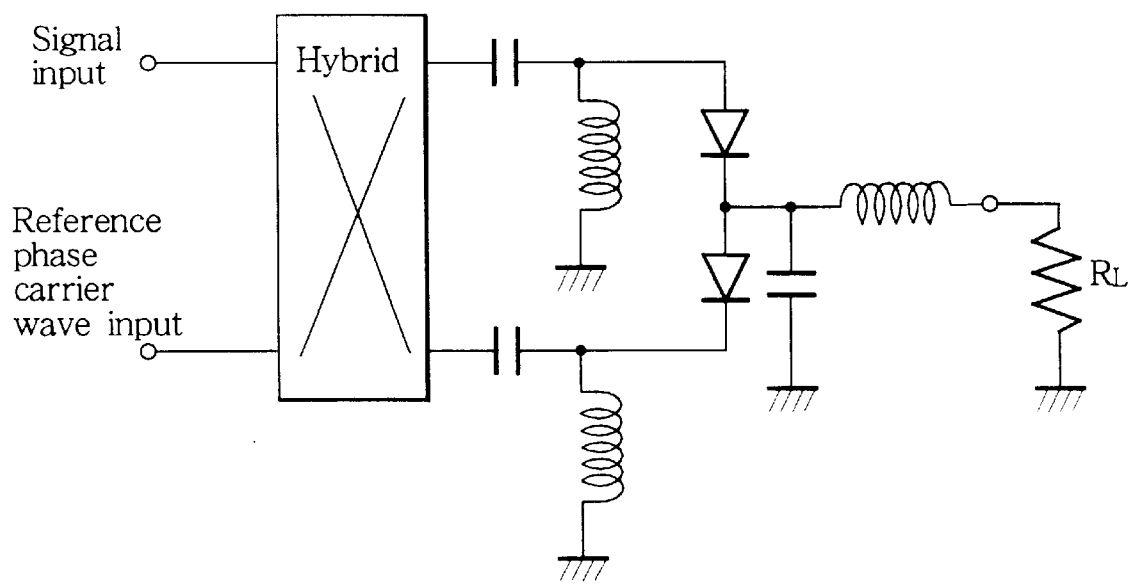
FIG. 6 is a circuit diagram showing one example of a PSK demodulator.

Lastly, as mentioned before, the RF modulator/demodulator modulates a carrier wave by the PSK (phase shift keying). The PSK method modulates a phase of the carrier wave by either of "0" and "$\pi$" corresponding to "1" and "0" status of an input pulse. For this, the PSK method preferably utilizes a ring modulator of a double balanced type as shown in FIG. 5. The RF modulator/demodulator further includes a demodulator composed of a phase detector, for example, as shown in FIG. 6. The phase detector detects a phase difference between a signal and a reference carrier wave.

As described above, according to the present invention, the packet process and the EFM process are performed at the transmitting station and the EFM decoding process and the unpacket process are performed at the receiving station. Therefore, the effect is obtained that the highly reliable digital communication is made possible at low cost, and further, the two-way communication can be easily realized.

What is claimed is:

1. A digital communication system comprising a transmitter station and a receiver station for communicating therebetween data at the transmitter station and the receiver station in different forms by means of a carrier wave:

the transmitter station including:
packet means for assembling a plurality of data words having an original format into a packet, each data word including at least one byte of data;
encoding means for encoding the data in the packet from an initial eightbit form into a fourteen-bit form; and
modulating means for modulating a carrier wave by the encoded data so as to transmit the packet of encoded data in the fourteen-bit form; and the receiver station including:
demodulating means receptive of the modulated carrier wave from the modulating means for demodulating the same to separate therefrom the packet of encoded data into the fourteen-bit form before modulation at the transmitter station;
decoding means for decoding the encoded data in the packet from the fourteen-bit form into the initial eight-bit form of the original format of the plurality of data words in a packet; and
unpacket means for disassembling the packet of decoded data to restore, at the receiver station, the plurality of data words having the original format,
wherein the transmitter station further includes database means for storing karaoke data for transmission of the karaoke data in response to a request for a karaoke song from the receiver station the request formed by data communicated through the digital communication system, from the receiver station to the transmitter station, and the receiver station further includes performance means for performing the karaoke song according to the karaoke data transmitted from the transmitter station.

2. A digital data transmitter/receiver apparatus for transmitting outgoing data words and receiving incoming data by means of a carrier wave in bi-directional communication, the digital data transmitter/receiver apparatus comprising:

packet/unpacket means for assembling a plurality of the outgoing data words having an original format into a forward packet, and for disassembling a backward packet of the incoming data to restore the original format of each of the data words, each of the data words including at least one byte of data;

encoding/decoding means for encoding data in the forward packet from an initial eight-bit form into a fourteen-bit form, and for decoding the incoming data in the backward packet from the fourteen-bit form into the initial eight-bit form; and modulating/demodulating means for modulating a first carrier wave by the encoded data so as to transmit the forward packet of the outgoing data words in the fourteen-bit form, and for demodulating a second carrier wave to separate therefrom the backward packet of the incoming data received in the fourteen-bit form.

3. The digital communication system as defined in claim 2, wherein the encoding/decoding means encodes from the initial eight-bit form into the fourteen-bit form such that adjacent "1" bits in the fourteen-bit form always have therebetween at least two and at most ten "0" bits.

4. The digital communication system as defined in claim 1, wherein the database means stores the karaoke data in a MIDI format.

5. The digital data transmitter/receiver apparatus as defined in claim 2, wherein the encoding/decoding means encodes from the initial eight-bit form into the fourteen-bit form such that adjacent "1" bits in the fourteen-bit form always have therebetween at least two and at most ten "0" bits.

6. The digital data transmitter/receiver apparatus as defined in claim 2, wherein either:

the digital data transmitter/receiver apparatus includes database means for storing karaoke data for transmission of the karaoke data in response to a request for a karaoke song from another digital data transmitter/receiver apparatus, or the digital data transmitter/receiver apparatus includes performance means for performing a karaoke song according to karaoke data transmitted from another digital data transmitter/receiver apparatus.

7. The digital data transmitter/receiver apparatus as defined in claim 2, wherein each forward packet assembled by the packet/unpacket means includes, in addition to the plurality of outgoing data words, header data of at least one byte.

8. The digital data transmitter/receiver apparatus as defined in claim 2, wherein each forward packet assembled by the packet/unpacket means includes, in addition to the plurality of outgoing data words, synchronization data of at least one byte.

9. The digital data transmitter/receiver apparatus as defined in claim 2, wherein each forward packet assembled by the packet/unpacket means includes, in addition to the plurality of outgoing data words, parity data of at least one byte.

10. The digital data transmitter/receiver apparatus as defined in claim 2, wherein each forward packet assembled by the packet/unpacket means includes 2048 outgoing data words, with each outgoing data word consisting of one byte of data.

11. The digital data transmitter/receiver apparatus as defined in claim 10, wherein each forward packet assembled by the packet/unpacket means also includes synchronization data of twelve bytes, header data of four bytes, P-parity data, and Q-parity data.

* * * * *